United States Patent [19]
Laing

[11] 3,803,432
[45] Apr. 9, 1974

[54] BEARING STRUCTURE FOR MOUNTING ROTORS IN MOTORS HAVING SPHERICAL AIR GAPS AND INCLUDING MEANS FOR LIMITING AXIAL MOVEMENT OF THE ROTORS

[76] Inventor: Nikolaus Laing, Hofener Weg 35 bis 37, 7141 Aldingen near Stuttgart, Germany

[22] Filed: Sept. 28, 1972

[21] Appl. No.: 293,104

[30] Foreign Application Priority Data
Oct. 7, 1971  Austria .............................. 8658/71

[52] U.S. Cl. ................................................ 310/90
[51] Int. Cl. ............................................ H02k 7/08
[58] Field of Search ............ 310/90, 166, 211, 104, 310/154, 266; 417/420

[56] References Cited
UNITED STATES PATENTS
| | | | |
|---|---|---|---|
| 3,438,328 | 4/1969 | Laing | 310/104 |
| 3,354,833 | 11/1967 | Laing | 310/104 |
| 3,649,137 | 3/1972 | Laing | 417/420 |
| 3,710,156 | 1/1973 | Laing | 417/420 |
| 3,178,600 | 4/1965 | Bers | 310/166 |

*Primary Examiner*—R. Skudy
*Attorney, Agent, or Firm*—Pennie & Edmonds

[57] ABSTRACT

In an electric motor with a spherical air gap, wherein the rotor is supported by a bearing permitting rotation and rocking about the center of curvature of this gap. Both the stator and the rotor have elements with concentric surfaces of revolution in relation to the axis of rotation and facing each other which so overlap each other that they prevent a separation between rotor and stator.

6 Claims, 2 Drawing Figures

BEARING STRUCTURE FOR MOUNTING ROTORS IN MOTORS HAVING SPHERICAL AIR GAPS AND INCLUDING MEANS FOR LIMITING AXIAL MOVEMENT OF THE ROTORS

THE PRIOR ART

Motors with spherical air gap are known as spherical motors. Among other features, they have the advantage, compared with conventional cylindrical types, that the rotor requires only a single bearing (often known as a spherical bearing) which is formed by a supporting column, a ball and a cup, and which resists both radial and axial forces. When such motors are applied to pumps and blowers, the shaft seal otherwise required may be replaced by a separating wall, made for example of stainless steel, joined to the casing.

A drawback of the system which has not hitherto been satisfactorily eliminated lies in the fact that such rotors in some circumstances may be unseated off the bearing and noise and damage may result.

THE OBJECT OF THE INVENTION

The invention aims to provide a device which satisfies the requirements of freedom from maintenance in the application of such rotors in spherical gap motors a for example to drive circulating pumps in heating installations or in boiling water reactors, and which prevents unseating of the bearing and therefore of the rotor.

DESCRIPTION OF THE INVENTION

The invention seeks to provide against unseating in such devices, in which usually the rotor is driven by a pole ring generating a rotating field. The pole ring may be a rotating permanent magnet or a non-rotating electro-magnetic pole ring with a single-phase or multi-phase a.c. winding.

The invention consists of a protective device which contains one convex and at least one concave component. The protection against separation according to the invention rests on the fact that the concave part protrudes beyond the equator of the convex part, i.e., encloses more than 180° of spherical angle.

DESCRIPTION OF THE DRAWING

The invention will be described by way of example with the help of the accompanying drawings in which.

DETAILED DESCRIPTION OF THE PREFERRED EMBODIMENTS

Figure 1:
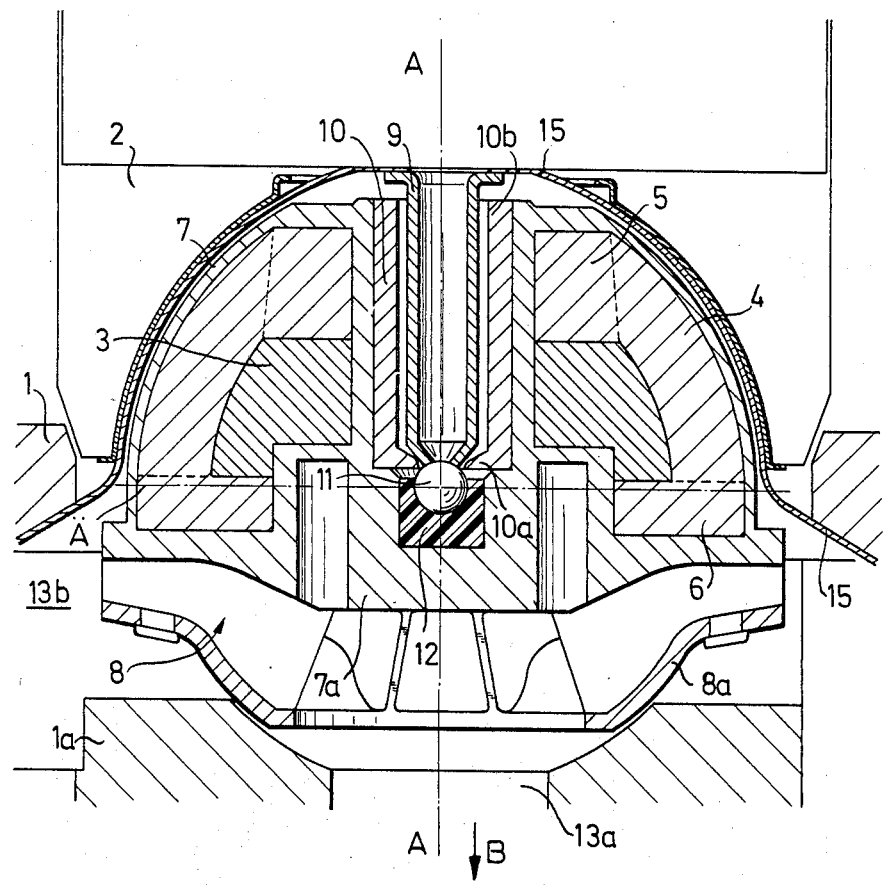
FIG. 1 shows, in section, a motor with a pump impeller and two movement-limiting devices for this pump impeller, which are independent of each other, wherein one of the limiting devices acts also as a preventative against rocking.

In both Figures the intention is to illustrate applications of the invention with a rotational axis vertical, or not far off the vertical, so that the relevant references (for example as to unseating) assume that gravity is effective at least when the motor is at rest. There may be non-vertical applications in which some force other than gravity is effective in relation to the bearing in which case the context will suggest to those skilled in the art what is required to achieve practicability. FIG. 1 shows, alongside a bearing for a pump motor impeller, two limiting devices, one against separation and the other against rocking. The stationary stator poles 2 which comprise a driving pole ring are provided with single-phase or multy-phase a.c. windings and are situated in the motor casing. In a modification, a rotating permanent magnet pole ring also comprising a driving pole ring is used. A separating wall 15, made of magnetically permeable material, is joined to the casing 1 and seals the stator space in relation to the rotor. The rotor consists of a sintered iron core 3, squirrel cage rods 4, upper and lower magnetically short-circuiting rings 5 and 6, and is provided with a plastic cover 7, which is integral with or positively attached to the pump impeller 8 seen at its lower side 7a. The rods 4 comprise a pole ring which is driven by the driving pole ring. The impeller shroud 8a which consists, for example, of lead, ensures in the non-rotating condition, when the rotation axis is vertical, stable equilibrium of the rotor by pendular effect. The suction aperture or intake eye 13a and the outlet 13b are formed in the pump casing 1a. The bearing support of the rotor assembly is constituted by a bearing cup 12 and a bearing ball 11. In this arrangement, the ball is fixedly attached to the supporting column 9, for example by brazing. The column 9 is attached to the separating wall 15. The cup 12 is fixed on the rotor. It extends beyond the equator A of the ball 11 surrounding more than 180° of spherical angle of the ball, thereby preventing a separation of the rotor in the direction B. The cup 12, at least in its equatorial region, consists of plastically or elastically deformable material to make the insertion of the ball 11 into the bearing cup 12 possible in assembly. The annular lip 10a which is fixedly attached to the rotor via the sleeve 10, the inside diameter of which lip is smaller than the diameter of the ball 11 (independently of the protection device against separation just described) also prevents unseating of the bearing because the lip 10a rests with its sharp edge against the ball 11 when the rotor tends to separate in the direction B. In addition, lip 10a as well as the upper end 10b of the sleeve 10 (made for example of P.T.F.E. polytetrafluoroethylene and firmly inserted into the rotor bore) limits the rocking of the rotor during slowing down. In running, an annular gap is maintained between lip 10a and ball 11 by the magnetic forces which are then effective, as well as by the pressure generated by the pump. These forces produce a resultant force in the sense of direction opposite to the arrow B. The rotor is thereby slightly raised so that the lip 10a recedes from the ball.

Figure 2:
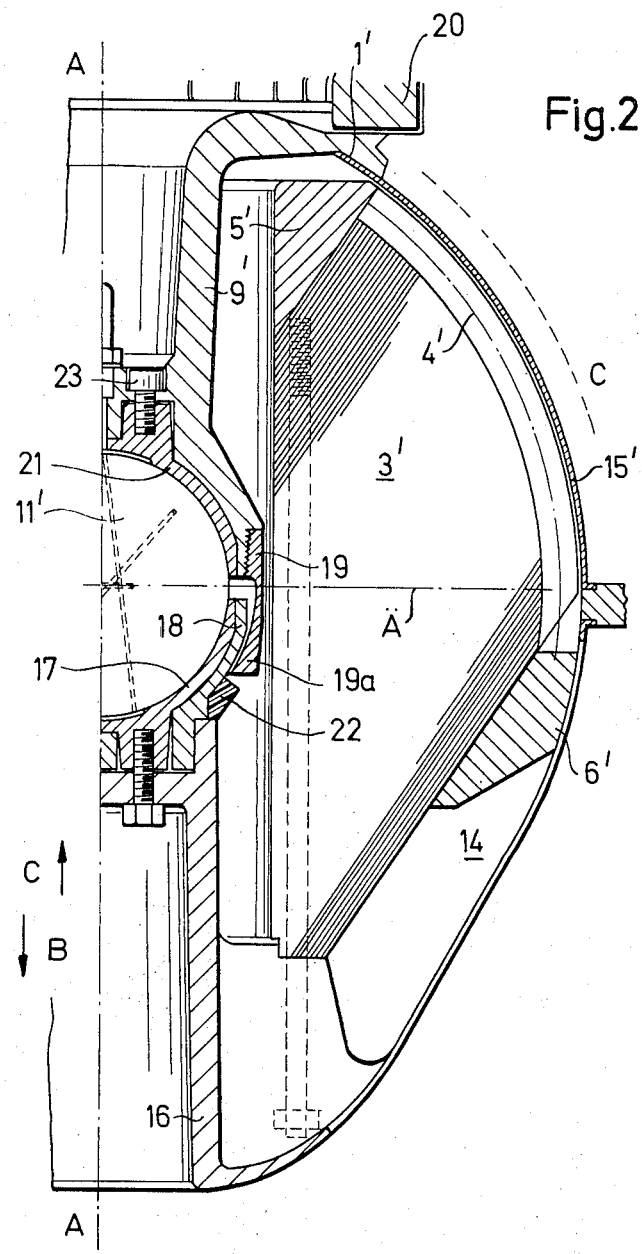
FIG. 2 shows, also in cross-section, a varied motor with a pump impeller which is provided with prevention against separation and rocking suitable for heavy rotors.

FIG. 2 shows a modification which prevents the separation of a slowing-down rotor and limits its rocking. This device is suitable for the bearing support of very heavy rotors. The stator space in which the windings 20 which form a driving pole ring are located is sealed by the separating wall 15' attached to the casing 1'. The rotor consists of a core 3', squirrel cage rods 4' which form a driven pole ring, an upper magnetically short-circuiting ring 5', a lower short-circuiting ring 6' and impeller blades 14. The bearing of the rotor is formed by an upper bearing cup 21, ball 11', and lower bearing cup 17. The latter component is rigidly attached to the rotor via the pump impeller hub 16. The upper bearing cup 21 is fastened to the supporting column 9', for example, by means of the screws 23. The supporting column 9' is secured to the casing 1'. The rotor is subject to a resultant force in the direction C due to the pressure forces generated by the pump as well as the magnetic forces, so that, the bearing cups 17, 21 are pressed firmly against the ball 11' and ensure bearing support of the rotor. Separation or unseating of the rotor when the pump is switched off is prevented by a limiting device operating as a plain bearing, in the form of a concave frustospherical part 19 and a complementary frustospherical convex part 18. The concave part 19 is attached to the supporting column 9', for example by a screw thread as illustrated. The convex part 18 is attached to the rotor by the pump impeller hub 16. Unseating of the rotor is prevented by the fact that the non-rotating concave part 19 extends beyond the equator A of the convex part 18 and the maximal diameter of the convex part 18 is larger than the minimal diameter or lower opening of the concave part 19a. When the pump is in operation the friction between the parts 18, 19, which are made of suitable bearing material, e.g. bronze, is eliminated because the rotor is pressed in the direction C, these parts therefore disengaging. A synthetic resin ring 22, made for example of P.T.F.E., serves as a buffer and limits the rocking or precession angle of the rotor by abutting the skirt of part 19a.

The functioning of the system according to the invention can be explained as follows:

When the motor in FIG. 1 is switched on, the entire pump impeller with its cup 12 is immediately pressed in the sense of direction opposed to the arrow B against the ball 11 at first by the pull of the electromagnetic field in the rotor gap and subsequently also by the hydraulic pressure of the pumped medium in the pump space. In the electromagnetic running gap of the system, all the force vectors, with the exception of the rotor weight, become symmetrically zero. The rotor adjusts itself concentrically to the axis A — A. When the motor is switched off or when, in the case of a failure, it ceases to be electrically energised and the rotor together with the pump has the tendency to separate in the sense of direction B and thereby to take up a rocking motion whilst its rotation is slowing down. This precession can cause damage at the periphery of the rotor and in the bearing support and also generates substantial noise. Both effects are prevented by the application and the particular design of the P.T.F.E. sleeve 10. When the rotor has the tendency to separate in the sense of direction B, the annular lip 10a formed underneath the sleeve 10 leans with its annular sharp edge against the upper spherical cup of the ball 11 and traps the separating rotor because the sleeve 10 is firmly fixed in the rotor bore. However, in continuous rotation, the rotor is slightly lifted in a direction opposed to B and a small gap is maintained between the sharp edge of the annular lip and the spherical surface, so that friction is avoided. When the rotor separates, in the course of the slowing down of its rotational motion it can thus rotate with the annular edge 10a hardly lifted off the sphere and without freedom for a precessional motion. This freedom is furthermore limited by the upper end 10 b of the protective sleeve which leans with its upper internal edge against the bearing pin and prevents a larger precessional angle. 10

When switching on the motor illustrated in FIG. 2, the rotor is slightly shifted in the sense of direction C and the bearing cups 17, 21 come into positive contact with the ball 11'. The following events then take place.

When the rotor separates, the internal surface of the part 19 comes into positive contact in its lower zone 19a with the outer surface of the supporting cup 18, i.e., the rotor when slowing down goes on rotating subject to the positive constraint of this auxiliary bearing, and finally stops. The ring 19 and the supporting cup 18 are made of suitable bearing material, e.g. bronze, and permit this short-duration plain bearing to operate without maintenance. The ring 19 thus serves as a limiting element. Beyond this, the design just described includes the synthetic resin ring 22 inserted over the lower region of part 18 from outside. This ring, by acting as an anti-rocking buffer, limits the rocking precession motion.

I claim:

1. A bearing structure for an electric motor having a rotor mounting a driven pole ring, a driving pole ring, a spherical air gap between the driven and driving pole rings, a convex bearing surface fixed with respect to one pole ring and a concave bearing surface fixed with respect to the other pole ring whereby said pole rings are mounted for limited universal movement with respect to each other, the improvement comprising in that said concave bearing surface extends around said convex bearing surface in excess of 180° whereby said convex surface is held within said concave bearing surface to limit axial movement of the convex and concave surfaces with respect to each other.

2. A bearing structure according to claim 1 wherein the convex surface is formed as a frusto-spherical bearing component which is fixedly mounted on a supporting column and where said supporting column is fixed with respect to said driving pole ring.

3. A bearing structure according to claim 2 wherein the concave bearing surface comprises a bearing cup which is fixed with respect to the rotor and said driven pole ring.

4. A bearing structure according to claim 3 further characterized in that the bearing cup comprises a plastically defomable material whereby the cup may be deformed and forced over the convex surface.

5. A bearing structure according to claim 1 further characterized in that the concave bearing surface comprises a ring which is fixed with respect to the driving pole ring by means of a screw thread.

6. A bearing structure according to claim 1 further characterized in that the convex bearing surface comprises a spherical ball fixed with respect to said driving pole ring and in that the concave bearing surface comprises a ring bearing element fixedly attached to the driven pole ring.

* * * * *